Patented Dec. 11, 1934

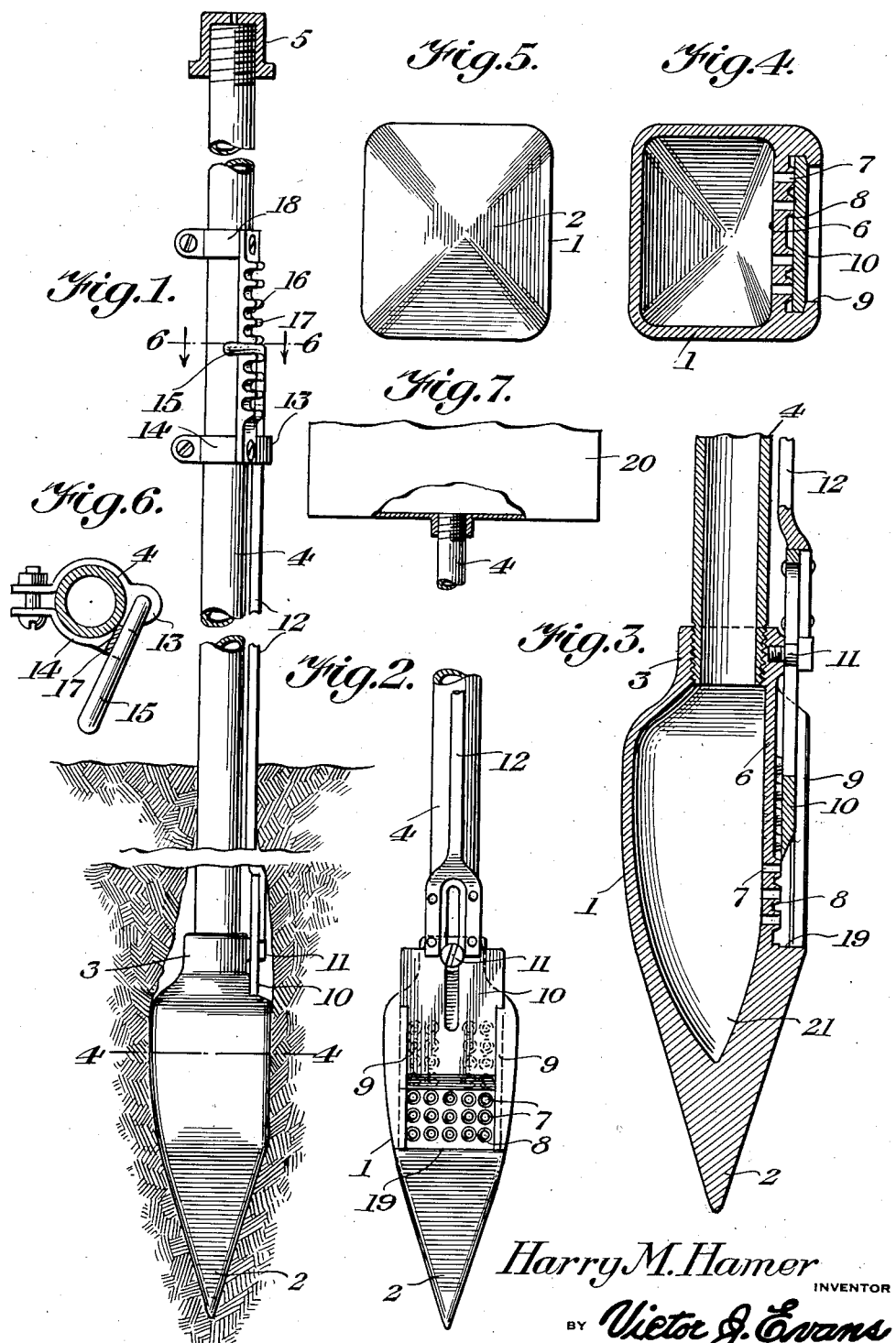

1,984,265

UNITED STATES PATENT OFFICE 1,984,265

COMBINED IRRIGATING DEVICE AND SUPPORT FOR TREES

Harry M. Hamer, Johnstown, Pa.

Application January 15, 1934, Serial No. 706,744

6 Claims. (Cl. 47—49)

This invention relates to a combined irrigating device and support for trees, plants, shrubbery and the like and has for the primary object, the provision of a device of the above stated character whereby water or liquid fertilizer may be delivered in desired amounts directly to the roots of plants, trees or shrubbery to insure proper growth thereof and also the device may have the shrubbery or plants tied thereto for the purpose of supporting the latter in a proper growing position.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a combined irrigating device and support constructed in accordance with my invention.

Figure 2 is a fragmentary elevational view illustrating the means of controlling the out-flow of the fluid from the device to the roots of the plant or tree.

Figure 3 is a fragmentary vertical sectional view illustrating the same.

Figure 4 is a sectional view taken on the line 4—4 of Figure 1.

Figure 5 is an end view illustrating the body of the device pointed for facilitating the insertion thereof into the ground.

Figure 6 is a detail sectional view taken on the line 6—6 of Figure 1.

Figure 7 is a fragmentary sectional view illustrating a supply tank.

Referring in detail to the drawing, the numeral 1 indicates a body of hollow formation and of any desired shape preferably having one end bevelled or tapered to provide a point 2 for facilitating the insertion of the body into the ground. The opposite end of the body is reduced and formed into an annular neck 3 which is internally screw threaded to receive the screw threaded end of a handle 4. The handle 4 is of tubular shape and has its upper end externally screw threaded to receive a closure cap 5 providing means whereby water may be poured into the handle and body or if desired fertilizer in liquid form may be placed into the handle or body. The handle 4 forms a reservoir for the water or liquid fertilizer and feeds to the body.

One side of the body above the tapered portion is provided with a thickened wall 6 provided with a plurality of apertures 7 that extend through bosses 8 formed on the outer face of said wall. The apertures are in communication with the interior of the body for the purpose of permitting the water or liquid fertilizer to escape therefrom. The thickened wall 6 of the body is cut away to form guide flanges 9 positioned outwardly of the outer ends of the apertures 7 and slidably receive a gate 10. The gate is adapted to form a closure for the apertures when in its lowermost position and is provided with a slot to receive a set bolt 11 carried by the neck 3 for limiting the sliding movement of the gate. An operating rod 12 is secured to the upper end of the gate and is slidably received within an ear 13 formed on a clamp 14 mounted upon the handle 4. The upper end of the rod is bent to form a hand grip 15 adapted to be moved into and out of the notches of a holding plate 17 by flexing said rod. The holding plate 17 is carried by the clamp 14 and also by a clamp 18 mounted on the handle 4 above the clamp 14. The clamps 14 and 18 are of the split type and are adjustably secured to the handle 4 by bolts and nuts. The lower portion of the thickened wall 6 of the body forms a shoulder or abutment 19 adapted to be engaged by the lower edge of the gate when the latter is in its lowermost position. The lower edge of the gate is bevelled to form a cutting edge for the purpose of severing the roots, growth, or foreign material which may enter the body by way of the apertures.

If desired a suitable tank or reservoir 20 containing water or liquid fertilizer may be threaded to the upper end of the handle 4 by removing the cap 5 for supplying an additional supply of fluid to the device.

In operation the body is inserted in the ground as shown in Figure 1 and to a depth equal to the depth of the roots of a plant, tree or shrub and with the handle and body filled with water or liquid fertilizer, the same may be allowed to escape from the body by way of the apertures by moving the gate upwardly. Thus it will be seen that the water or fertilizer may be fed to the roots in close proximity thereto thus assuring proper nourishment. The device may be allowed to remain in the ground adjacent the plant, tree or shrub indefinitely and at intervals the handle may be filled with the desired liquid and should the roots reaching out for the nourishment enter the apertures, the rod 12 may be moved upwardly and downwardly several times so that the cutting edge of the gate may sever such portions of the roots that may extend into the body, thus keeping the device free and unclogged.

By referring to Figure 3 it will be noted that the hollow portion of the body extends below the abutment 19 forming a chamber 21 in which sediment and foreign matter such as portions of severed roots may collect.

The device may also be employed for staking a small tree, shrubbery or plants by tying the latter to the handle.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A combined irrigating device and support comprising a hollow handle to provide a reservoir for liquid, a body connected to said handle and of hollow formation to receive liquid therefrom and adapted to be inserted in the ground adjacent the roots of a plant, said body having perforations to permit the escape of liquid therefrom, and means for opening and closing said perforations.

2. A combined irrigating device and support comprising a hollow handle to provide a reservoir for liquid, a body connected to said handle and of hollow formation to receive liquid therefrom and adapted to be inserted in the ground adjacent the roots of a plant, said body having perforations to permit the escape of liquid therefrom, and a slidable gate for opening and closing the perforations and adapted to act as a cleaner for removing foreign matter from said perforations.

3. A combined irrigating device and support comprising a hollow handle to provide a reservoir for liquid, a body connected to said handle and of hollow formation to receive liquid therefrom and adapted to be inserted in the ground adjacent the roots of a plant, said body having perforations to permit the escape of liquid therefrom, a slidable gate for opening and closing the perforations and adapted to act as a cleaner for removing foreign matter from said perforations, and an operating rod connected to the gate for adjusting the latter into various positions.

4. A combined irrigating device and support comprising a hollow handle to provide a reservoir for liquid, a body connected to said handle and of hollow formation to receive liquid therefrom and adapted to be inserted in the ground adjacent the roots of a plant, said body having perforations to permit the escape of liquid therefrom, a slidable gate for opening and closing the perforations and adapted to act as a cleaner for removing foreign matter from said perforations, an operating rod connected to the gate for adjusting the latter into various positions, and means for holding the rod in various adjusting positions.

5. A combined irrigating device and support comprising a hollow handle, a hollow body connected to the handle and having a tapered portion to provide a point for aiding in inserting the body into the ground adjacent the roots of a plant, said handle and body adapted to be filled with a liquid, one side of said body being thickened and perforated, guide flanges on said body about the perforations, a gate slidable in said flanges for opening and closing the perforations and having one end bevelled to form a cutting edge, and an operating means for the gate.

6. A combined irrigating device and support comprising a hollow handle to provide a reservoir, a hollow body detachably secured to the handle and having a pointed end for facilitating the insertion of the body into the ground adjacent the roots of a plant, said body having perforations, means for opening and closing said perforations, and a supply tank connected to the handle.

HARRY M. HAMER.